United States Patent [19]

Kamiya

[11] 4,163,193

[45] Jul. 31, 1979

[54] BATTERY VOLTAGE DETECTING APPARATUS FOR AN ELECTRONIC TIMEPIECE

[75] Inventor: Masaaki Kamiya, Tokyo, Japan

[73] Assignee: Kabushiki Kaisha Daini Seikosha, Japan

[21] Appl. No.: 738,722

[22] Filed: Nov. 4, 1976

[30] Foreign Application Priority Data

Nov. 4, 1975 [JP] Japan ................................ 50-132338

[51] Int. Cl.[2] .............................................. G01N 27/42

[52] U.S. Cl. ................................ 324/29.5; 58/23 BA; 58/152 H

[58] Field of Search ............... 324/29.5; 340/248, 249; 58/23 BA, 152 H

[56] References Cited

U.S. PATENT DOCUMENTS 3,898,790 8/1975 Takamune ........................ 58/152 H 3,991,553 11/1976 Bergey ............................. 58/152 H

*Primary Examiner*—M. Tokar

*Attorney, Agent, or Firm*—Robert E. Burns; Emmanuel J. Lobato; Bruce L. Adams

[57] ABSTRACT

A battery voltage detecting circuit for detecting a low battery voltage condition. A memory stores a reference digital voltage signal defining a digital value of a reference voltage level of a battery. A battery voltage measuring circuit digitally measures battery voltage and develops a digital voltage output signal representative of the measured battery voltage. The battery voltage measuring circuit includes a voltage-pulse signal generator which generates a number of pulses representative of battery voltage, and a counter circuit for counting the pulses and for developing a digital count representative of the measured battery voltage. A digital comparator circuit compares the refrence digital voltage signal and the digital voltage signal representing battery voltage for comparing the same and for developing an output signal when the digital voltage signal representing battery voltage coincides with the reference digital voltage signal.

4 Claims, 6 Drawing Figures

BATTERY VOLTAGE DETECTING APPARATUS FOR AN ELECTRONIC TIMEPIECE

BACKGROUND OF THE INVENTION

This invention relates to a battery voltage detecting circuit and apparatus for an electronic timepiece which detects the voltage.

The electric timepiece using a battery has the defect wherein the battery must be exchanged for new battery before the lifetime of the battery has ended.

More particularly, at the present, the wearer forgets often the time for exchanging the battery since the lifetime of the battery for an electronic timepiece is extended by the improvement of the electronic timepiece circuit and the battery structure of the electronic timepiece. Therefore, it has been proposed that the electronic timepiece in which the battery voltage detecting apparatus is incorporated, generate in the alarm just before the end of the lifetime of the battery.

Most electronic timepieces detect with analogue comparison the condition when the battery voltage level lowers below a setting voltage level which is determined by a resistance element and a semiconductor. However, the desired setting voltage cannot be obtained is not able to if the variation of the semiconductor-characteristic is not compensated.

Therefore, the conventional battery voltage detecting apparatus has the disadvantage that the variation of the semiconductor-characteristic has to be compensated and the adjusting work has to be made to individual electronic timepieces.

SUMMARY OF THE INVENTION

The object of the present invention is to provide a battery voltage detecting apparatus for an electronic timepiece which detects the battery voltage by comparing the battery voltage changed to a digital value with a reference voltage digital value stored in a memory circuit.

DESCRIPTION OF THE PREFERRED EMBODIMENTS

Figure 1:
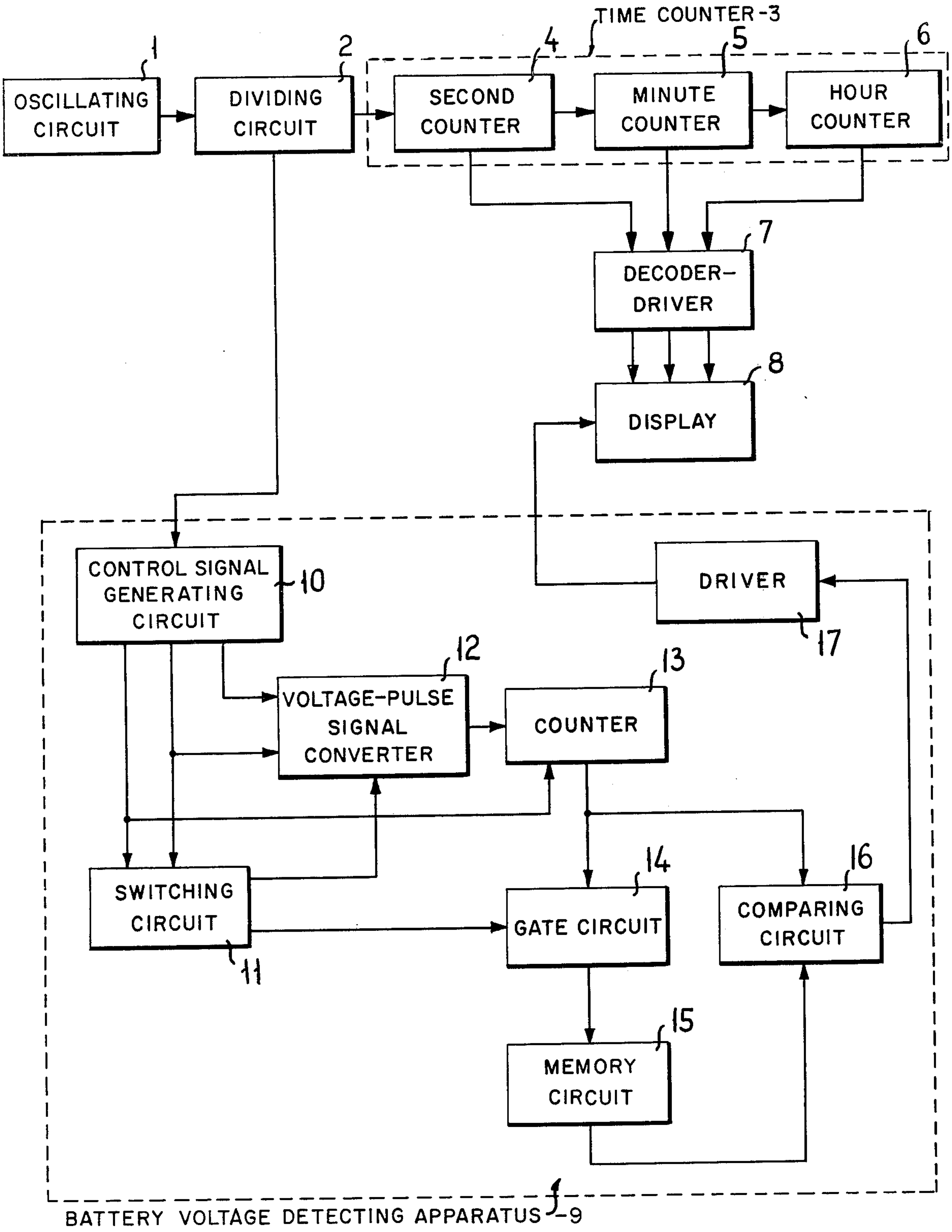
FIG. 1 is the block diagram of an electronic timepiece having the battery voltage detecting apparatus according to this invention.

Referring now to embodiments illustrated in the drawings, FIG. 1 is the block diagram of an electronic timepiece having the battery voltage detecting apparatus according to this invention.

Reference numeral 1 depicts an oscillating circuit using a solid-state vibrator. The oscillating output signal of this oscillating circuit is applied to the dividing circuit 2 including a plurality of cascaded dividing stages and is divided to the frequency functioning as the time measuring standard, namely the frequency of 1 Hz.

This reference signal is provided to the time counter 3. The time counter 3 is comprised of the 60-counter 4 receiving the reference signal, the 60-counter 5 receiving the output signal of the 60-counter 4, and the 24-counter 6. The BCD code counting code which is derived from the respective counters of the time counter 3 is applied to the decoder-driver 7 including decoders and drivers corresponding to second, minute and hour time increments. The display signal derived from the decoder-driver 7 is provided to the display 8 for displaying the time.

The display 8 displays the time in response to the output of the decoder-driver 7 and displays an alarm indication depending on the drop of the battery voltage in response to the output of the battery voltage detecting apparatus 9.

The battery voltage detecting apparatus 9 includes the control signal generating circuit 10 receiving the dividing signal derived from a predetermined dividing stage of the dividing circuit 2. This control signal generating circuit 10 produces a plurality of control signals required in the battery voltage detection operation, and a reset pulse and a measuring signal derived from the control signal generating circuit 10 are applied to the switching circuit 11.

The switching circuit 11 generates the switching signal synchronized with the above reset pulse and the above measuring signal. And this switching signal is provided to the voltage-pulse signal converter 12 for converting the battery voltage to a pulse number together with the measuring signal and the clock pulse derived from the control signal generating circuit 10.

The pulse derived from the voltage-pulse signal converter 12 is provided to the counter 13 which also receives the reset pulse derived from the control signal generating circuit 10. The output of the counter 13 is provided to the gate circuit 14 controlled to open and close by the output of the switching circuit 11.

The signal passed through the gate circuit 14 is provided to the memory circuit 15, and the content of this memory circuit 15 is applied to the comparing circuit 16 which also receives the output of the counter 13. The output of the comparing circuit 16 is provided to the display 8 after it is amplified by the driver 17.

The operation of the electronic timepiece is described.

The oscillating output signal derived from the oscillating circuit 1 is divided to the one $H_3$ frequency signal of serving as the time standard by the dividing circuit 2. This $H_3$ signal is provided to the second-counter 4 comprising the time counter 3 and the output signal of the second-counter 4 is provided to the minute-counter 5. And further, the output signal of the minute-counter 5, namely, a one hour pulse is provided to the hour-counter 6.

The respective counting contents or counts developed by these counters 4, 5 and 6 are provided to the display driving display 8 after those are converted to the signal for the seven segments by the decoder-driver 7. The display 8 displays digitally the time in response to the display driving signal.

On the one hand, the control signal generating circuit 10 of the battery voltage detecting circuit 9 generates the reset pulse, clock pulse and measuring signal to the dividing signal derived from the dividing circuit 2.

Assuming now that the battery voltage is set in the predetermined reference value and that the switching signal is generated by the switching circuit 11, the voltage-pulse signal converter 12 generates a number of pulses corresponding to the battery voltage at this time. These pulses are counted by the counter 13 and the counting content is applied to the memory circuit 15 through the gate circuit 14 and stored in the memory circuit 15.

Thereafter, the switching circuit 11 and counter 13 are reset by the reset pulse derived from the control signal generating circuit 10 and the voltage-pulse signal converter 12 produces a number of pulses corresponding to the battery voltage level in use with the measuring signal. This output of the voltage-pulse signal converter 12 is counted by the counter 13 and the counter content is provided to the comparing circuit 16.

Now, when the voltage level of the battery in use drops to the predetermined reference voltage level, the content of the counter 13 coincides with the stored content of the memory circuit 15. At this time, the comparing circuit 16 generates a coincidence signal and this signal is amplified to a certain level by the driver 17, and the amplified coincidence signal is provided to the display 8. The display 8 displays the alarm indication which informs of the drop of the battery voltage, and the display 8 also displays the time.

Figure 2:
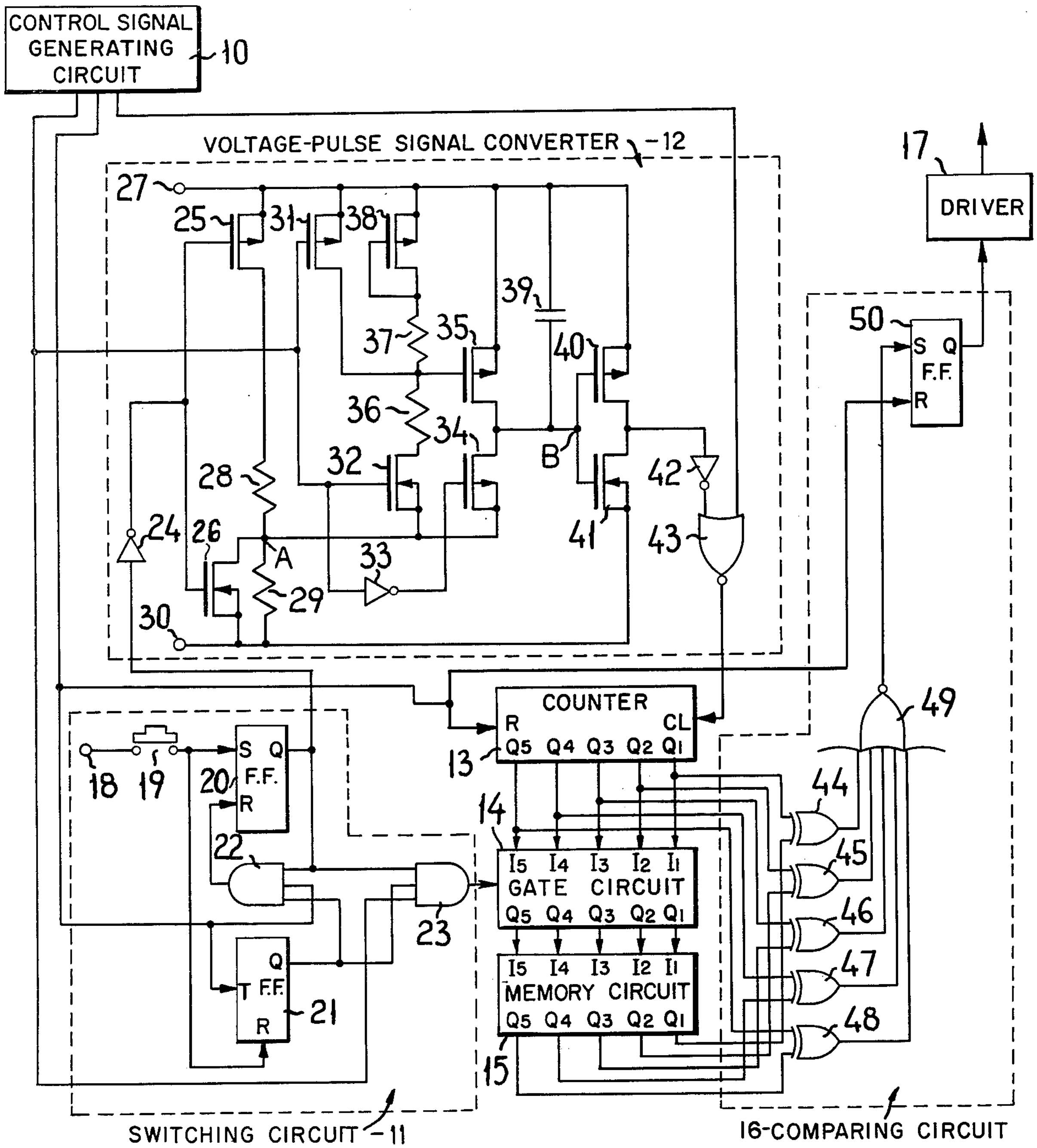
FIG. 2 is the main circuit of the battery voltage detecting apparatus of the electronic timepiece according to this invention.

FIG. 2 is the main circuit of the battery voltage detecting apparatus as shown in FIG. 1.

The same component parts in the different FIGS. are identified with the same reference numerals.

In FIG. 2, the switching circuit 11 has the switch 19 connected to the one terminal of the high voltage level of the battery. The switching signal obtained with the operation of the switch 19 is applied to the set terminal S of the flipflop 20 (hereinafter called as FF) and the reset terminal R of FF 21. The output Q of the FF 20 is applied to the respective input terminal of the AND circuits 22 and 23. On the other hand, the input terminal T of the FF21 receives the reset pulse derived from the control signal generating circuit 10 and output Q of the FF21 is applied to the respective input terminal of the AND circuits 22 and 23. And also, the above reset pulse is applied to another input terminal of the AND circuit 22 and the output of the AND circuit 22 is applied to the reset terminal R of the FF20.

Another input terminal of the AND circuit 23 receives the measuring signal derived from the control signal generating circuit 10 and the output of the AND circuit 23 is applied to the gate circuit 14. And also, the output Q of the FF20 is provided to the AND circuits 22, 23, and the voltage-pulse signal converter 12 including the inverter 24.

The output Q of the FF20 of the switching circuit 11 which is applied to the voltage-pulse signal converter 12, is inverted by the inverter 24 and applies to the gate electrodes of the P channel MOS FET (P.FET) 25 and N channel MOS FET (N.FET) 26.

The source electrode of the P.FET 25 is connected to the high voltage level terminal 27 of the battery voltage and the drain electrode of it is connected to the drain electrode of the N.FET 26 and the resistor 29, namely, the common connecting point A through the resistor 28. And the source electrode of the N.FET 26 and another terminal of the resistor 29 are connected to the low voltage level terminal 30 of the battery voltage.

On the other hand, the measuring signal derived from the control signal generating circuit 10 is provided to the gate electrode of the P.FET 31 connected to the high voltage terminal 27 at the source electrode thereof and is provided to the gate electrode of the N.FET 32 connected to the common connecting point A at the source electrode thereof. And further the measuring signal of the control signal generating circuit 10 is provided to the gate electrode of the P.FET 34 connected to the common connecting point A at the source electrode thereof.

The drain electrode of the P.FET 31 is connected to the gate electrode of the P.FET 35 which is connected to the high voltage level terminal 27 at the source terminal thereof and is connected to the drain electrode of the N.FET 32 through the resistor 36.

And also, the drain electrode of the P.FET 31 is connected commonly to the gate electrode and drain electrode of the P.FET 38 through the resistor 37, and the P.FET 38 is connected to the high voltage level 27 at the source terminal thereof.

The drain electrode of the P.FET 35 is connected to the drain electrode of the N.FET 34 and to one terminal of the condenser 39 having another terminal connected to the high voltage level terminal 27, and further the connecting point B is connected to the gate electrode of the P.FET 40 having a high conductive constant and the gate electrode of the N.FET 41 having a low conductive constant. The source electrode of the P.FET 40 is connected to the high voltage level terminal 27 and the source electrode of the N.FET 41 is connected to the low voltage level terminal 30.

The drain electrode of the P.FET 40 and the drain electrode of the N.FET 41 are connected to one another and the respective drain electrodes are connected to the input terminal of the inverter 42. The output of the inverter 42 is applied to one input terminal of the NOR circuit 43 which also receives the clock pulse signal derived from the control signal generating circuit 10 at the another terminal thereof.

The output of the NOR circuit 43 is provided to the counting terminal CL of the counter 13 as the output of the voltage-pulse signal converter 12. The reset terminal R of the counter 13 receives the reset pulse derived from the control signal generating circuit 10.

The respective output terminals $Q_1$–$Q_5$ which develop output signal levels representing the count content of the counter 13 are connected to the input terminals $I_1$–$I_5$ of the gate circuit 14.

One input terminal of the exclusive OR circuit 44 composing the of circuit 16 is connected to the output terminal $Q_1$, one input terminal of the exclusive OR circuit 45 is connected to the output terminal $Q_2$, one input terminal of the exclusive OR circuit 46 is connected to the output terminal $Q_3$, one input terminal of the exclusive OR circuit 47 is connected to the output terminal $Q_4$, and one input terminal of the exclusive OR circuit 48 is connected to the output terminal $Q_5$.

The output terminals $Q_1$–$Q_5$ of the gate circuit 15 are connected to the input terminals $I_1$–$I_5$ of the memory circuit 15 respectively and the respective output terminals $Q_1$–$Q_5$ of the memory circuit 15 are connected to the comparing circuit 16 as follows the output terminal $Q_1$ is connected to the one terminal of the exclusive OR circuit 44, the output terminal $Q_2$ is connected to the one terminal of the exclusive OR circuit 45, the output terminal $Q_3$ is connected to the one terminal of the exclusive OR circuit 46, the output terminal $Q_4$ is connected to the one terminal of exclusive OR circuit 47 and the output terminal $Q_5$ is connected to the one terminal of exclusive OR circuit 48.

The respective outputs of these exclusive OR circuits 44–48 comprising the comparing circuit 16 are applied to the NOR circuit 49 and the output of this NOR circuit 49 is applied to the set terminal S of the FF50.

The reset terminal R of the FF50 receives the reset pulse derived from the control signal generating circuit 10 and the output terminal Q of the FF50 is provided to the driver 17 as the output of the comparing circuit 16.

Next, the operation of the switching circuit of the battery voltage detecting apparatus for the electronic timepiece according to this invention will be described with reference to the waveforms shown in FIG. 3.

The control signal generating circuit 10 generates the measuring signal as shown by the waveform 10*a*, the reset pulse as shown by the waveform 10*b* and the clock pulse as shown by the waveform 10*c*.

The switching circuit 11 receives the measuring signal and the reset signal and the switch 19 is in the OFF state normally.

Accordingly, the output Q of the FF20 (the waveform 20*a*) is normally in the OFF state. And also, the output Q of the FF21 switches from the logical level "0" to logical level "1" when the reset pulse (the waveform 10*b*) is applied to the FF21.

Assuming now that the switching signal as shown in the waveform 19*a* is generated by the switch 19, the Q output level of the FF20 changes to be in the state of logical level "1" and the FF21 is reset so that output Q level of the FF21 is in the state of logical level "0." Thereafter, the output Q level of the FF21 becomes logical level "1" when the FF21 receives the reset pulse (the waveform 10*b*).

The output of the AND circuit 23 changes to the logical level "1" as shown in the waveform 23*a* since the measuring signal (the waveform 10*a*) changes to the state of logical level "1" when the output Q of the FF21 changes to the state of logical level "1." And also, the output of the AND circuit 23 changes to the state of logical level "0" when the measuring signal (the waveform 10*a*) changes to the state of logical level "0."

Next, the FF20 is reset by the output (the waveform 22*a*) of the AND circuit 22 and the output Q of the FF20 changes to the state of logical level "0." Thereafter, the output Q of the FF20 and the output of the AND circuit 23 respectively are maintained in the state of logical level "0" if the switch 19 is not operated.

Next, the operation of the voltage-pulse signal converter 12 will be described with reference to the waveforms shown in FIG. 4.

On the occasion that the Q output level of FF20 of the switching circuit 11 is logical level "0", the P.FET25 and the N.FET26 respectively are in the OFF state and in the ON state. Accordingly, the voltage level $V_A$ of the common connecting point A is near the voltage level $V_L$ of the low voltage terminal 30 if the conductive resistance value of the N.FET 26 is lower than the value of the resistor 28.

When the Q output level of the FF20 in the switching circuit 11 is logical level "1", the voltage level $V_A$ of the A point is a voltage level determined by the voltage divider circuit comprised of by the resistor 28 and the resistor 29.

In this embodiment, the ratio of the resistor 28 to resistor 29 is set so that the voltage between the high voltage level terminal 27 and the point A is the minimum voltage with which the timepiece circuit operates in the normal state when the voltage is applied between the high voltage terminal 27 and the point A.

The operation of the circuit portion comprised of components identified by the reference numerals 31–43 will be described.

Figure 3:
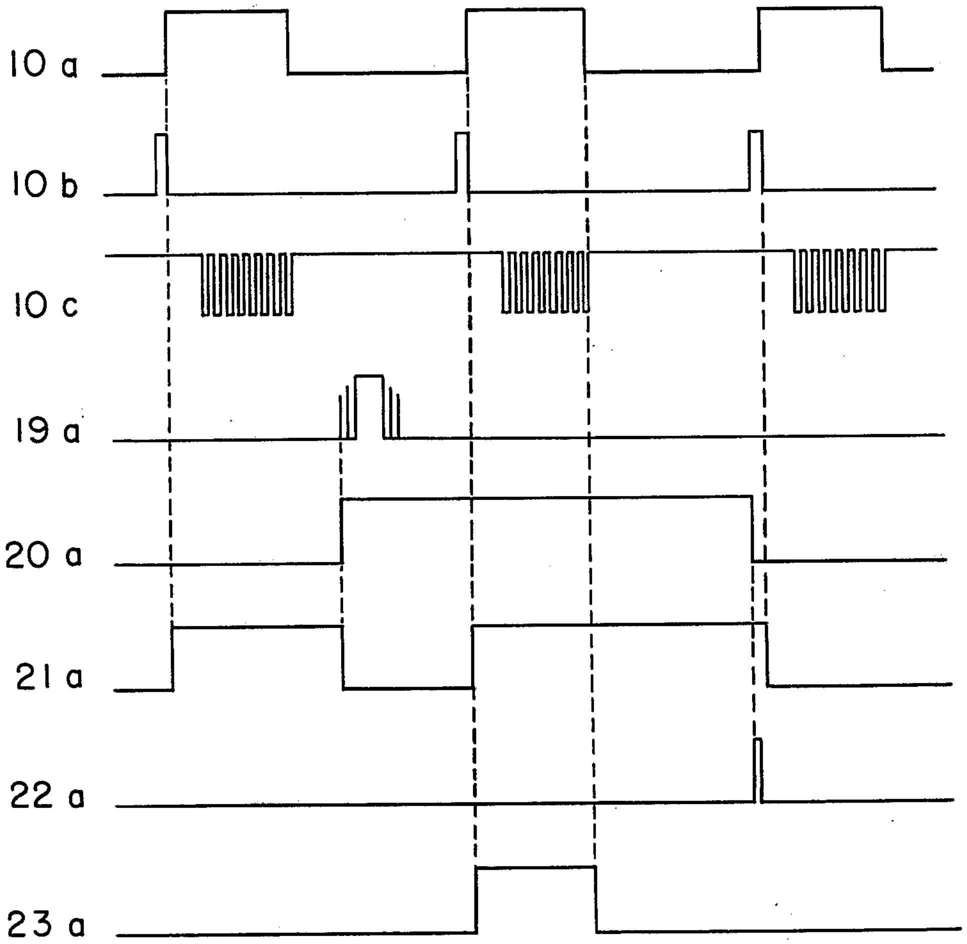
FIG. 3 illustrates the waveforms developed during the operation of the switching circuit in the battery voltage detecting apparatus of the electronic timepiece as shown in FIG. 2.
Figure 4:
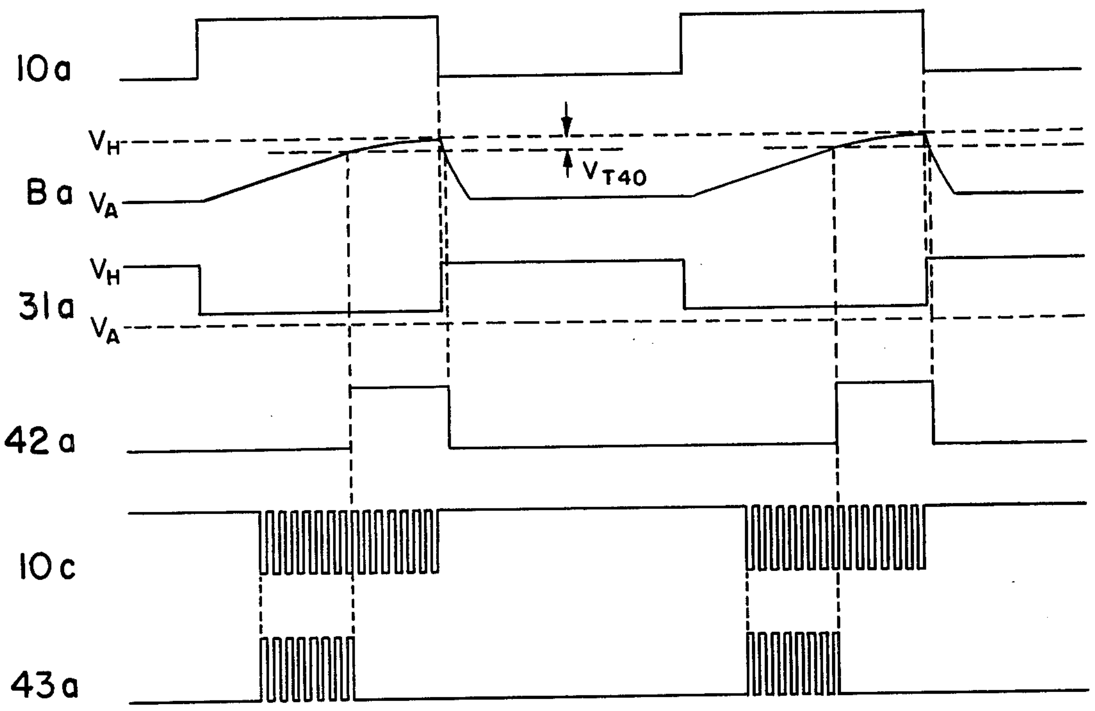
FIG. 4 illustrates the waveforms developed during the operation of the voltage-pulse signal converter of the battery voltage detecting apparatus for the electronic timepiece as shown in FIG. 2.

In FIG. 4, the signal as shown by the waveform 10*a* is the measuring signal coinciding with the signal of the waveform 10*a* as shown in FIG. 3.

The P.FET 31 is in the ON state when it does not receive this measuring signal. When the P.FET 31 is ON the N.FET 32 is in the OFF state. Accordingly, the gate electrode voltage level of the P.FET 35 is near the voltage level $V_H$ of the high voltage level terminal 27 whereby the P.FET 35 is in the OFF state.

On the other hand, at this time, the voltage level of the B point is near the voltage level $V_A$ as shown in the waveform Ba since the N.FET 34 is in the ON state.

And, the voltage near to the voltage level between the high voltage level terminal 27 and the point A is applied across the electrodes of the condenser 39.

Accordingly, the P.FET 40 is in the ON state and the N.FET 41 is the OFF state.

And also, the output of the inverter 42 is at the state of the logical level "0" and the output of the NOR circuit 43 is at the state of the logical level "0." In such state, the P.FET 31 and P.FET 34 change to the OFF state and the N.FET 32 changes to the ON state when the measuring signal (the waveform 10*a*) changes to the state of logical level "1."

Accordingly, the condenser 39 discharges through the P.FET 35. The discharging current in this time is the drain current of the P.FET 35.

Herein, the drain current is determined by the gate-source voltage $V_{GS}35$ of the P.FET 35 and the voltage $V_{GS}35$ is determined by the N.FET 32, the resistors 36 and 37 and the P.FET 38.

Assuming now that the ON resistance value of the N.FET 32 is lower than that of the resistors 36 and 37 and that the threshold voltage of the P.FET 38 is $V_T38$ and the respective resistances of the resistors 36 and 37 are $R_{36}$ and $R_{37}$, the gate-source voltage $V_{GS}35$ is as follows;

$$1\ V_{GS}35\ 1 = R_{37}(V_{SS} - V_T38)/(R_{37}+R_{36}) + V_T38 = (V_{SS} - V_T38)/N + V_T38 \quad (1)$$

where N is $R_{36}+R_{37}/R_{37}$ and $V_{SS}$ is the voltage between the high voltage level point 27 and the point A.

Accordingly, assuming that $k_{35}$ is the conductive constant of the P.FET 35 and $V_T35$ is the threshold voltage, the drain current $I_D35$ of the P.FET 35 is as follows;

$$I_D35 = k_{35}(V_{GS}35 - V_T35)^2 = k_{35}\{(V_{SS} - V_T35)/N\}^2 \quad (2)$$

The voltage variation of the point B derived from this drain current is shown in the waveform Ba and also the gate voltage of the P.FET 35 is shown in the waveform 31*a*.

As understood from the above, the condenser 39 discharges with the constant current corresponding to the voltage between the high voltage level terminal 27 and the point A when the measuring signal is applied to the voltage-pulse signal converter 12. Accordingly, the voltage level at the point B rises linearly to the predetermined voltage level.

On the other hand, the P.FET 40 and the N.FET 41 switch with threshold voltage $V_T$40 of the P.FET 40 not depending on the variation of the battery voltage since the conductive constant of the P.FET 40 is higher than that ot the N.FET41. Accordingly, the voltage level of the point B rises with the discharge of the condenser 39.

And when the voltage level between this point B and the high voltage level terminal 27 attains the predetermined voltage level, namely the threshold voltage of the FET40, the P.FET40 changes to the OFF state and the output of the P.FET40, namely, the input of the inverter 42 changes from the logical level "1" to the logical level "0."

On the other hand, the time $\tau$ required for the voltage between the point B and the high voltage level point 27 to attain to the predetermined voltage $V_T$40 is as follows since the threshold voltages of the MOS.FETs formed in the same chip are equal in general.

$$\tau = N^2 \cdot C / k_{35} (V_{SS} - V_T 35) \quad (3)$$

where C is the capacitance value of the condenser.

From this equation, the time $\tau$ required until the P.FET40 switches after the initiation of the discharge derived from the condenser 39, is in inverse proportion to the voltage between the high voltage level terminal 27 and the point A. Accordingly, the output of the inverter 42 is as shown in the waveform 42*a*.

And also, another input terminal of the NOR circuit receives the clock pulse shown by the waveform 10*c* derived from the control signal generating circuit 10. Accordingly, the NOR circuit 43 produces a number of pulses, as shown in the waveform 43*a*, in inverse proportion to the pulse width of the pulse derived from the inverter 42.

Assuming now that the predetermined voltage is applied between the high voltage level terminal 27 and the low voltage level terminal 30 and that the switch 19 is operated, the output Q of the FF20 changes to the logical level "1" and also the output of the AND circuit 23 changes to the logical level "1."

Figure 5:
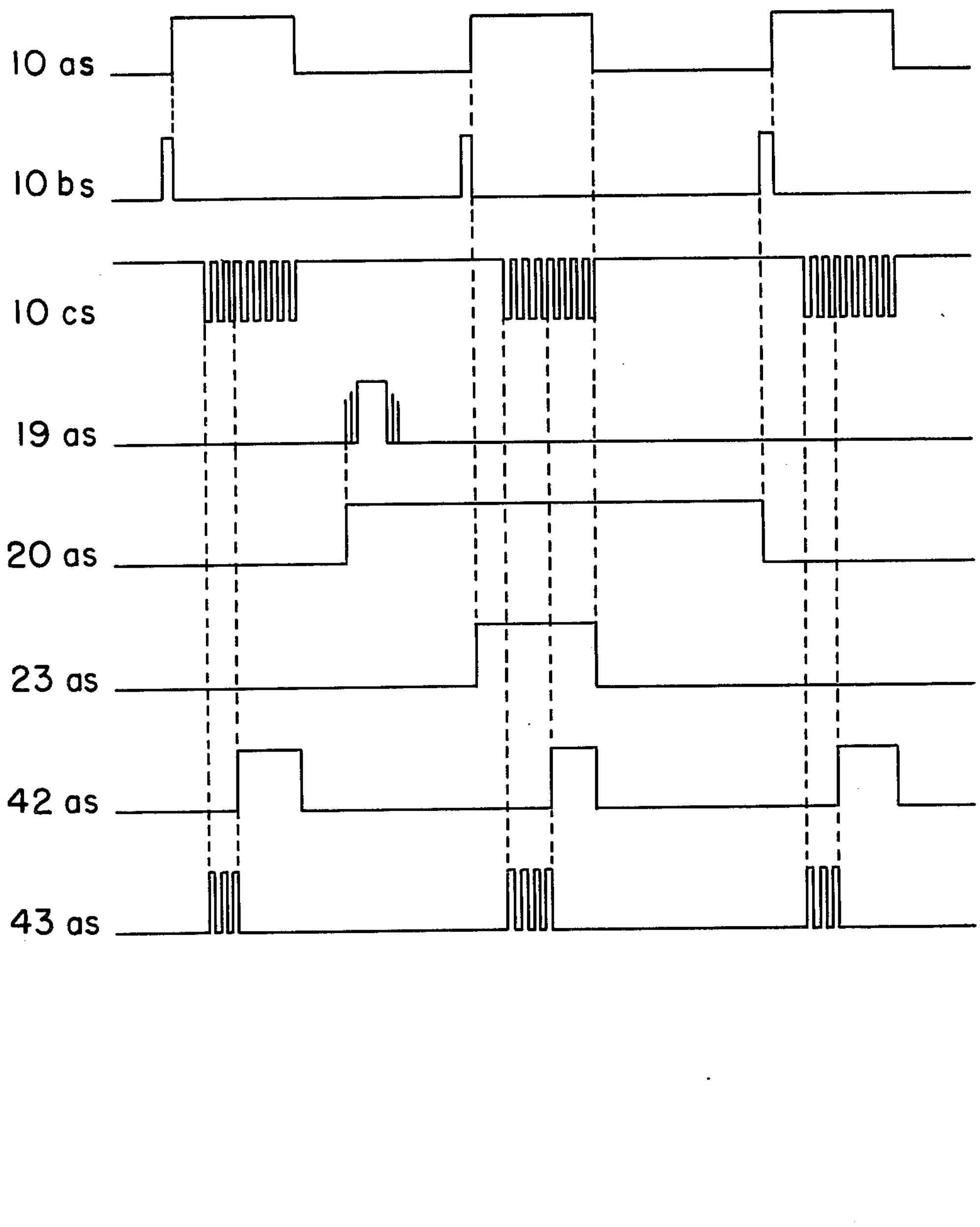
FIG. 5 illustrates the waveforms developed during the operation of the battery voltage detecting apparatus for the electronic timepiece as shown in FIG. 2.

At this time, the switching signal, the output Q of the FF20 and the output of the AND circuit 23 respectively are depicted by the waveform 19*as* of FIG. 5, the waveform 20*as* and the waveform 23*as*.

When the output Q of the FF20 changes to the logical level "1," the condenser 39 discharges with the input measuring signal (the waveform 10*as*) and the inverter 42 generates the pulse (the waveform 42*as*) corresponding to the reference voltage whereby the pulse is applied to the one terminal of the NOR circuit 43, since the reference voltage namely, the minimum voltage possible to operate the timepiece circuit normally is applied between the high voltage level terminal 27 of the voltage-pulse signal converter 12 and the point A.

The output of the NOR circuit 43 becomes the number of pulses (the waveform 43*as*) corresponding to the reference voltage and are applied to the counter 13 since another input terminal of the NOR circuit 43 receives the clock pulse as shown by the waveform 10*cs*.

The counter 13 counts the output of the NOR circuit 43 and the counting content or count is developed as output signals at the respective output terminals $Q_1$–$Q_5$. On the one hand, the gate circuit 14 is in the conductive state since the output of AND circuit 23 of the switching circuit 11 is logical level "1". Accordingly, the counting content of the counter 13 is stored in to the memory circuit 15 through the gate circuit 15 and this stored content is applied to the exclusive OR circuits 44–48 of the comparing circuit 16.

On the other hand, the counting content of the counter 13 is also applied directly to the exclusive OR circuits 44–48.

Thereafter, when the measuring signal (the waveform 10*as*) changes from logical level "1" to logical level "0," and the reset pulse (the waveform 10*bs*) is applied to the switching circuit 11 and the counter 13, both the output Q of the FF20 and the output of the AND circuit 23 become logical level "0." And the counter 13 is reset.

Accordingly, the voltage between the high voltage level terminal 27 of the voltage-pulse signal converter 12 and the point A is near the applied voltage and the gate circuit 14 becomes non-conductive. Thereafter, when the measuring signal is applied to the voltage-pulse signal converter 12, the number of pulses derived from the NOR circuit 43 corresponds to the voltage between the high voltage level terminal 27 and the low voltage level terminal 30.

The pulse derived from the NOR circuit 43 is counted by the counter 13 and the outputs of the counter 13 are applied to the exclusive OR circuits 44–48 of the comparing circuit whereby the outputs of the counter 13 are compared with the stored content of the memory circuit 15 corresponding to the predetermined reference voltage.

The output of the NOR circuit 43 is the pulse number corresponding to the voltage applied between the high voltage level terminal 27 and the low voltage level terminal 50.

At the normal state, the battery voltage is applied between the high voltage level terminal 27 and the low voltage level terminal 30.

Accordingly, when the battery voltage drops to the predetermined voltage, the pulse number derived from the NOR circuit 43, namely, the counting content of the counter 13 coincides with the content of the memory circuit 15.

As a result, all the outputs of the exclusive OR circuit 44–48 become the logical level "0" and the output of the NOR circuit 49 becomes logical level "1" at this time whereby the output a of the FF50 changes logical level "1" and is applied to the driver 17.

As mentioned above, when the voltage of the battery in use attains the predetermined reference voltage level, a number of pulses corresponding to the reference voltage are generated by the voltage-pulse signal converter 12.

And this output of the voltage-pulse signal converter 12 is compared with the output of the comparing circuit 16 whereby one is informed by the comparing circuit signal that the battery voltage has attained to the reference voltage decreased.

Figure 6:
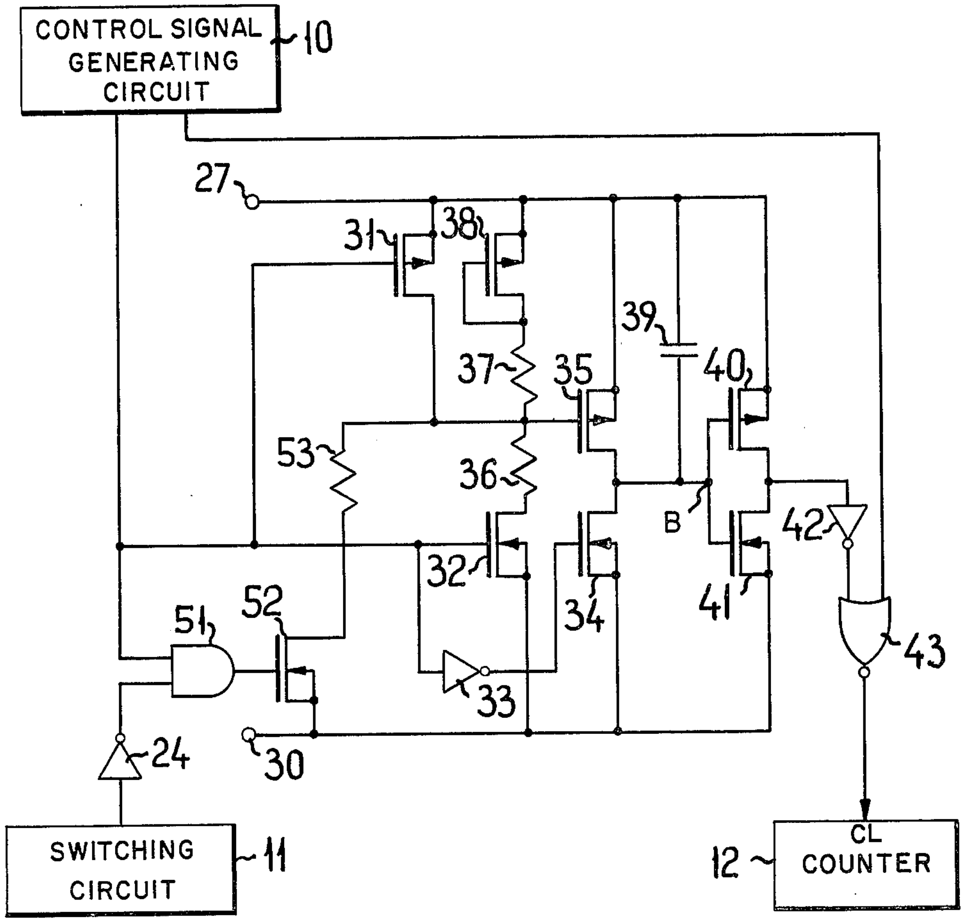
FIG. 6 is the circuit of another embodiment of the voltage-pulse signal converter of the battery voltage detecting apparatus for the electronic timepiece.

FIG. 6 illustrates a circuit of another embodiment of the voltage-pulse signal converter.

In FIG. 6, the same reference numeral as that of FIG. 2 depicts the same component element as used in FIG. 2 so as facilitate understanding.

The voltage-pulse signal converter 12 as shown in FIG. 6 has the AND circuit 51, the N.FET 52 and the resistor 53 instead of the P.FET 25, the N.FET 26 and the resistor 29 of the voltage-pulse signal converter. The AND circuit 51 receives the measuring signal from the control signal generating circuit 10 and the output signal of the switching circuit 11 through the inverter 24. And the output of the AND circuit 51 is applied to the gate electrode of the N.FET 52.

The source electrode of the N.FET 52 is connected to the respective source electrodes of the N.FETs 32 and 34 and to the low voltage level terminal 30. And also, the drain electrode of the N.FET 52 is connected to the connecting point of the drain electrode of the P.FET 31, the resistors 36 and 37, and the gate electrode of the P.FET 35 through the resistor 53.

The description will be abbreviated since the rest of the construction is the same as that of the voltage-pulse signal converter 12 shown in FIG. 2. In the voltage-pulse signal converter illustrated in FIG. 2, the determination of the gate-source voltage of the P.FET 35 is made by the determination of the voltage between the high voltage level terminal 27 and the source electrode of the N.FET 32 in FIG. 2 whereas, in this embodiment illustrated in FIG. 6, the determination of the gate-source voltage of the P.FET 35 is made by the change of the dividing ratio of the resistors 36, 37 and 53 depending upon the conductive and non-conductive state of the N.FET 52 which is determined according to the output signal of the switching circuit 11 in the state applying the predetermined voltage between the high voltage level terminal 27 and the low voltage level terminal 30.

The gate-source voltage of this P.FET 35 is set by the threshold voltage of the P.FET 38 and the resistors 36, 37 since the output of the AND circuit 51 is logical level "0" so that the N.FET 52 is in the OFF state, in no relation to the measuring signal, when the signal of the switching circuit 11 is applied to the P.FET 35.

On the other hand, on the occation that the output signal of the switching circuit 11 is not generated, the output of the AND circuit 51 becomes logical level "1" so that the N.FET 52 becomes conductive when the measuring signal is applied to the AND circuit 51. Accordingly, the gate-source voltage of the P.FET 35 is determined by the threshold voltage of the P.FET 38, and the resistance values of the resistors 36, 37 and 53.

As understood from the above description, the gate-source voltage of the P.FET 35 on the occasion that the switching circuit 11 generates an output signal is lower than when the switching circuit 11 does not generate the output signal. Accordingly, the discharging time of the condenser 39 increases.

In operation, the predetermined voltage is applied between the terminal 27 and the terminal 30 and the counter 13 counts the number of pulses corresponding to the gate-source voltage of the P.FET 35 with the signal derived from the switching circuit 11.

Thereafter, the memory circuit 15 stores the content of the counter 13.

After the output signal of the switching circuit 11 stops being generated the applied battery voltage is divided by the P.FET 38, the resistors 36, 37 and the resistor 53 so that the gate-source voltage of the P.FET 35 is produced and the NOR circuit 43 generates the number of pulses corresponding to this gate-source voltage of the P.FET 35.

Since the gate-source voltage of the P.FET 35 drops depending on the drop of the battery voltage, the pulse number derived from the NOR circuit 43 increases. And the output of the memory circuit 15 coincides with the content of the counter 13 counting the output of the NOR circuit 43, when the battery voltage drops to the predetermined voltage level.

As mentioned above, the battery voltage detecting apparatus for the electronic timepiece according to this invention has been described.

However, the scope of this invention is not limited the above embodiments illustrated in the drawings and includes within its scope variations thereof.

For example, in the embodiment, the predetermined voltage is applied to the voltage-pulse signal converter and the reference voltage obtained by with dividing this predetermined voltage by the resistance ratio.

Thereafter, the memory circuit stores the counting value of the pulse number corresponding to the reference voltage. However, the memory circuit is able to store the pulse number corresponding to the external voltage which coincides with the reference voltage. And also, the bit numbers of the counter and memory circuit can be increased or decreased.

And further, the progressive drop of the battery voltage can be detected step by step with the use of a plurality of the comparing circuits.

As mentioned the above, the battery voltage detecting apparatus according to this invention comprises the voltage-pulse signal converter generating the number of pulses corresponding to the battery voltage, the memory circuit for storing the content of the counter counting the pulses corresponding in number to the reference voltage and the comparing circuit for comparing the counting corresponding to the battery voltage with the content of the memory circuit wherein the comparing circuit generates the detecting signal of the low battery voltage condition.

And even if the circuit constant depending upon the deviation of the circuit element characteristic composing the respective circuit changes among respective electronic timepieces, the pulse number stored in the memory circuit coincides with the pulse number derived from the voltage-pulse signal converter when the battery voltage drops to the above reference voltage whereby the comparing circuit generates the output signal thereof.

Accordingly, the battery voltage detecting apparatus is able to indicate with certainty that the battery voltage has attained to the predetermined voltage value.

And also, the battery voltage detecting apparatus according to this invention is not required to be adjusted as is the conventional battery voltage detecting apparatus.

I claim:

1. In a battery powered electronic timepiece, a low battery voltage detecting circuit comprising: memory means for storing a reference digital voltage signal defining a digital value of a reference voltage level of a battery which powers the electronic timepiece; battery voltage measuring means for digitally measuring battery voltage and for developing a digital voltage output signal representative of the measured battery voltage; and a digital comparator circuit connected to receive the stored reference digital voltage signal and the digital voltage signal representing battery voltage for comparing the same and for developing an output signal when the digital voltage signal representing battery voltage coincides with reference digital voltage signal.

2. In a battery powered electronic timepiece according to claim 1, wherein said battery voltage measuring means comprises voltage-pulse generating means responsive to the battery voltage for developing a number of pulses representative of battery voltage; and a counter circuit connected for counting the pulses developed by said battery voltage measuring means and for developing a digital count in response thereto representative of the measured battery voltage, said digital count corresponding to the digital voltage output signal of said battery voltage measuring means.

3. In a battery powered electronic timepiece, a low battery voltage detecting circuit comprising: voltage-pulse generating means responsive to the voltage level of a battery which powers the electronic timepiece for generating a number of pulses representative of the battery voltage, said voltage-pulse generating means including a capacitor, charing means for charging the capacitor to a voltage level corresponding to the battery voltage level, discharging means for periodically discharging said capacitor, and means responsive to the voltage level of the discharging capacitor for developing a number of output pulses determined by that voltage level, wherein the number of pulses is representative of the battery voltage; a counter circuit connected for counting the pulses developed by said voltage-pulse generating means and for developing a digital count in response thereto representative of the measured battery voltage; memory means for storing a reference digital voltage signal defining a digital value of a reference voltage level of the battery voltage; and a digital comparator circuit connected to receive the stored reference digital voltage signal and the digital voltage signal representing battery voltage for comparing the same and for developing an output signal when the digital voltage signal representing battery voltage coincides with the reference digital voltage signal.

4. In a battery powered electronic timepiece according to claim 3, wherein said voltage-pulse generating means includes a C-MOS inverter pair having a gate terminal connected to said capacitor for responding to a voltage stored in said capacitor to control generation of said pulses.

* * * * *